J. HARRIS.
Harvester.
No. 80,479.
Patented July 28, 1868.
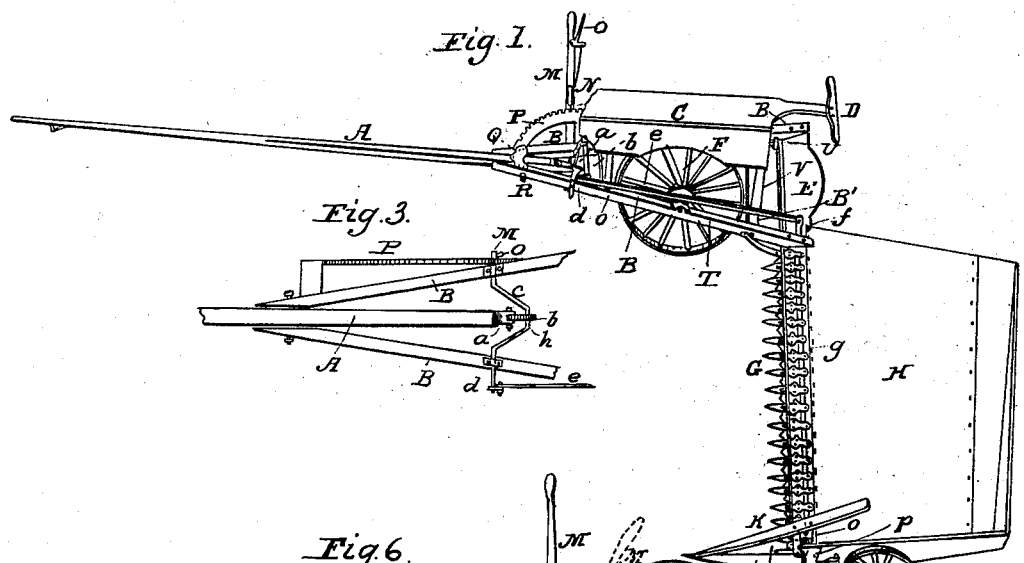
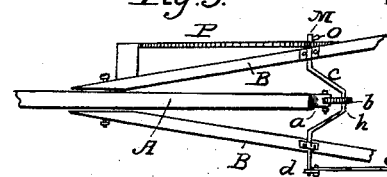
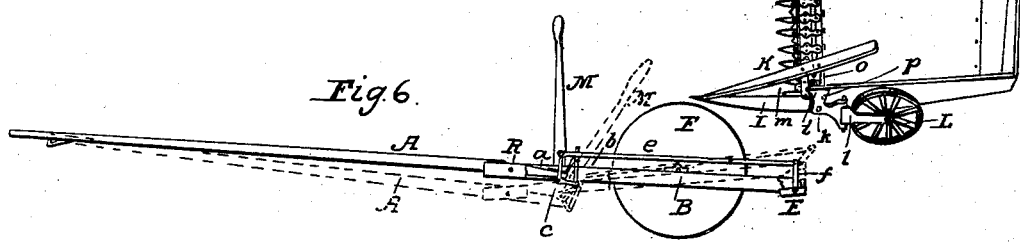
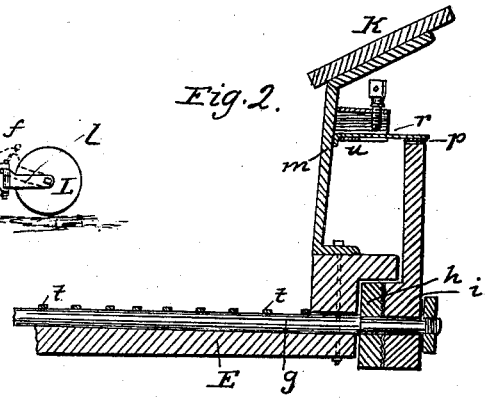
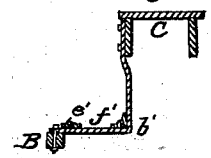
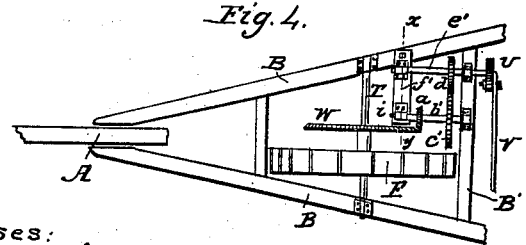
Witnesses:
Sylvanus D. Locke
G. H. Williston
Inventor:
James Harris

United States Patent Office.

JAMES HARRIS, OF JANESVILLE, WISCONSIN.

Letters Patent No. 80,479, dated July 28, 1868.

---

IMPROVEMENT IN HARVESTERS.

---

*The Schedule referred to in these Letters-Patent and making part of the same.*

---

TO ALL WHOM IT MAY CONCERN:

Be it known that I, JAMES HARRIS, of the city of Janesville, in the county of Rock, and State of Wisconsin, have invented a new and improved Mode of Constructing Harvesters; and I do hereby declare that the following is a full and exact description thereof, reference being had to the accompanying drawings, making a part of this specification, in which—

Figure 1 is a perspective view, with reel and seat detached.

Figure 2 is a vertical section of the grain-end, on the line of the rod $g$.

Figure 3 is a view from the under side of the forward end of the framework and pole, showing the connecting-mechanism for raising and lowering the cutting-device.

Figure 4 is a top view (as it would appear with the box C removed) of the driving-mechanism for the sickle.

Figure 5 is a vertical section through the line $x-y$ of the same; and

Figures 6 and 7 are side views, showing how the cutting-device is raised and lowered.

The nature of my invention consists in a certain combination of the parts hereinafter more fully described, whereby both ends of the cutting-device of a harvester are raised or lowered separately or simultaneously.

To enable others skilled in the art to make and use my invention, I will proceed to describe its construction and operation.

I construct my machine in any of the ordinary forms of the single-wheel harvester, providing it with the ordinary appendages, as a drive-wheel, F, framework B B, pole A, cutter-bar E, pitman V, sickle G, guards $t$, platform H, grain-divider I, grain-board K, grain or caster-wheel L, and reel and seat, and other parts not shown.

To secure the raising and lowering of the cutting-device, I attach to the frame B B, by suitable bearings, a shaft, $c$, that has the part, $h'$, between the bearings, turned out, so as to form a double crank, as shown. This crank is connected by the rod $b$ to the arm $a$ of the pole A, and the shaft is operated by a hand-lever, M, that is provided with an ordinary spring-catch, N–O, that works in the circular ratchet P.

These devices directly affect only the end of the platform and cutter-bar nearest the drive-wheel.

To raise and lower the other or grain-end, I attach to the inner end of the shaft $c$, a crank, $d$, that is connected by the rod $e$ to the crank $f$. This crank $f$ is attached to the lifting-rod or shaft $g$, that runs underneath the guards $t$, in a groove in the cutter-bar, or in any suitable bearings, and is attached firmly to the clutch $h$, that couples with the part $i$.

The parts, $h$ and $i$, of the coupling are held together by the nut $k$, fig. 2. The part, $i$, is hinged to the arm $l$ of the caster-wheel L. The use of the clutch-coupling $h\ i$ is to adjust the altitude of the grain-end of the harvester; but the clutch $h$ may be dispensed with and the part, $i$, attached directly to the rod $g$; or the arm $l$ of the grain-wheel may, without the intervention of other parts, be attached directly to the rod $g$.

Owing to the movement and weight of the machine, and the torsion or twisting of the rod $g$, it is found that the grain-end of the harvester is subject to a constant vertical vibration or movement that greatly impedes the progress and perfectness of the work. To prevent this vertical movement I make the part, $i$, of the clutch-coupling in the form somewhat of a segment of a circle, as shown, and upon its circular face apply a brake, $r\ p$, that has its fulcrum in the part, $u$, of the box $s$, that is attached to or cast on the part, $m$, of the harvester. This brake is operated in any suitable manner, as by the screw $o$, that works in the upper part of the box, as more fully shown in fig. 2.

My driving-mechanism for the sickle is shown in fig. 4, and consists of a bevelled wheel, W, keyed to the shaft T of the "bull"-wheel F, and working in a bevelled pinion, $a'$, attached to a shaft, $b'$, that is supported at one end by the cross-bar B', and at the other end by the elbow-shaped support $f'$, that is secured at one end to the side of the box C, while the other end rests on the frame-piece B; also of a spur-wheel, $c'$, secured to the shaft $b'$, and working in a spur-pinion, $d'$, secured to the shaft $e'$, that is supported in the same manner as the shaft $b'$. On the outer end of the shaft $e'$ is the crank-head U, that operates, through the pitman V, the sickle G.

To raise the cutting-device, it is only necessary to carry the hand-lever M back to the position shown by the dotted lines in fig. 6, thereby turning the shaft $c$, and carrying down the crank $h'$, and through it the rod $b$ and the end of the pole, when the parts assume the position shown by the dotted lines in fig. 6, and the end of the cutter-bar nearest the drive-wheel is raised. The shaft $c$, turning, carries back the crank $d$, and with it the rod $e$ and the crank $f$, thereby turning the rod $g$, and raising the grain-end of the harvester, as shown by dotted lines in fig. 7.

By carrying the hand-lever forward the operation is reversed, and the cutter-bar is lowered.

It will be observed that the shaft $c$ is not dispensed with, in order to allow either end of the cutter-bar to be raised independently of the other end, as that shaft is indispensable. To raise the end of the finger-bar next the drive-wheel, the shaft $c$, crank $h'$, and link $b$, are the only parts used or required, the raising of the bar being accomplished by changing the inclination of the pole A with reference to the framework. If either the crank $h'$ or the link $b$ be dispensed with, the grain-end of the finger-bar is raised, while the other end remains stationary. To raise the grain-end of the cutter-bar, the power is transmitted from shaft $c$, through crank $d$, while, to raise the driving-wheel end, it is transmitted through the crank $h'$.

I do not claim the raising and lowering, *per se*, of either end of the cutter-bar, nor of both ends, but simply the arrangement of the devices by which those results are accomplished.

What I do claim, is—

1. The arrangement of the shaft $c$, operated by the hand-lever M, and having thereon the crank $d$, with the rod $e$, crank $f$, shaft $g$, and caster-wheel L, substantially as and for the purpose described.

2. The combination and arrangement of the shaft $g$, with the part $i$, and brake $r\ p$, either with or without the clutch $h$, whereby the vertical vibration caused by the torsion of the rod is prevented, substantially as described.

3. The combination and arrangement of the rod $g$, part $i$, and arm $l$, the last two forming the caster-arm of the grain-wheel L, when the part $i$ is attached directly to the rod $g$, and is made the fulcrum upon which the caster-arm turns, as well as the moving lever, by means of which the cutter-bar is raised or lowered, substantially as described.

4. The combination and arrangement of the lever M, shaft $c$, cranks $d$ and $h'$, rods $b$ and $e$, crank $f$, shaft $g$, clutch $h$, part $i$, and brake $r\ p$, substantially as and for the purpose set forth.

JAMES HARRIS.

Witnesses:
SYLVANUS D. LOCKE,
J. B. WHITING.